Dec. 12, 1950 W. A. RAY 2,533,624
LIQUID LEVEL AND TEMPERATURE CONTROL SYSTEM
Filed June 19, 1946 3 Sheets-Sheet 1

INVENTOR
William A. Ray
BY John Flam
ATTORNEY

Dec. 12, 1950 W. A. RAY 2,533,624
LIQUID LEVEL AND TEMPERATURE CONTROL SYSTEM
Filed June 19, 1946 3 Sheets-Sheet 2
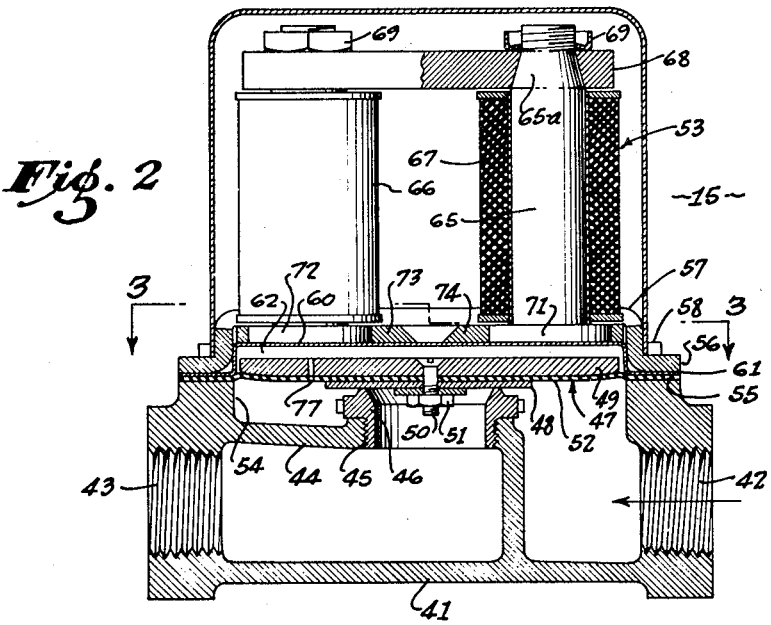
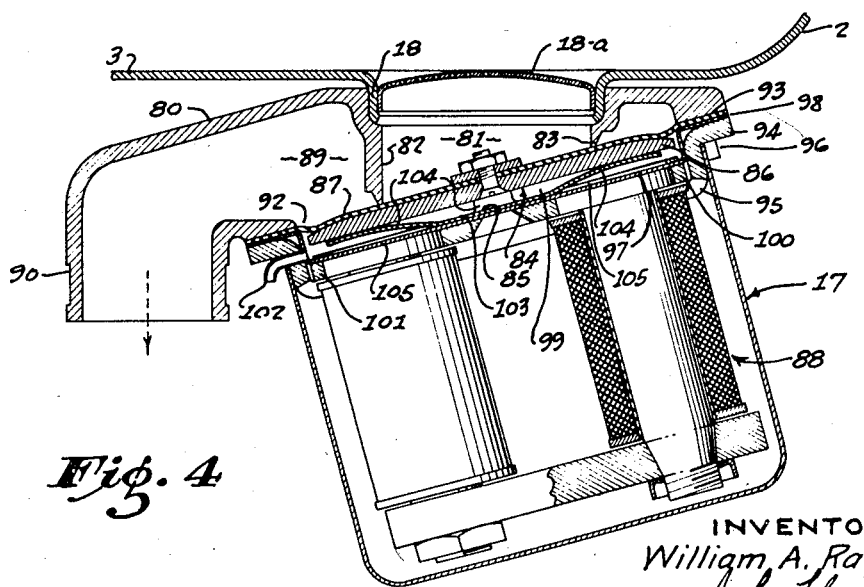
INVENTOR
William A. Ray
BY John Flam
ATTORNEY Dec. 12, 1950 W. A. RAY 2,533,624
LIQUID LEVEL AND TEMPERATURE CONTROL SYSTEM
Filed June 19, 1946 3 Sheets-Sheet 3

INVENTOR
William A. Ray
BY John Flam
ATTORNEY

Patented Dec. 12, 1950

2,533,624

UNITED STATES PATENT OFFICE 2,533,624

LIQUID LEVEL AND TEMPERATURE CONTROL SYSTEM

William A. Ray, Glendale, Calif., assignor to General Controls Co., Glendale, Calif., a corporation of California Application June 19, 1946, Serial No. 677,728

2 Claims. (Cl. 236—12)

This invention relates to a control system for regulating the supply of liquid, such as water to an automatic washer or other apparatus.

It is an object of this invention to provide an improved and simplified system of this character.

It is another object of this invention to provide a liquid control system adapted to insure proper operating temperature of the body of delivered liquid.

It is another object of this invention to provide a control system so arranged that its operation is not hindered by the presence of lint, dirt, etc., resulting from the operation of the apparatus, and which may be cleaned readily when desirable.

It is another object of this invention to provide a control system having improved means for stopping the liquid flow, when the liquid level reaches a predetermined point.

It is another object of this invention to provide an improved form of electromagnetic valve in which the proper operation of the valve is not affected adversely by incrustation or deposit of solids, such as frequently occurs with hot water.

It is another object of this invention to provide an electromagnetic valve so arranged as to prevent too rapid closing and resultant water hammer.

It is another object of this invention to provide an improved form of electromagnetically operated drain valve.

This invention possesses many other advantages, and has other objects which may be made more clearly apparent from a consideration of several embodiments of the invention. For this purpose there are shown a few forms in the drawings accompanying and forming part of the present specification. The forms will now be described in detail illustrating the general principles of the invention; but it is to be understood that this detailed description is not to be taken in a limiting sense, since the scope of this invention is best defined by the appended claims.

In the drawings:

Fig. 2 is a section showing one of the supply valves of the system;

Fig. 4 is a section showing the drain valve;

Figure 1:
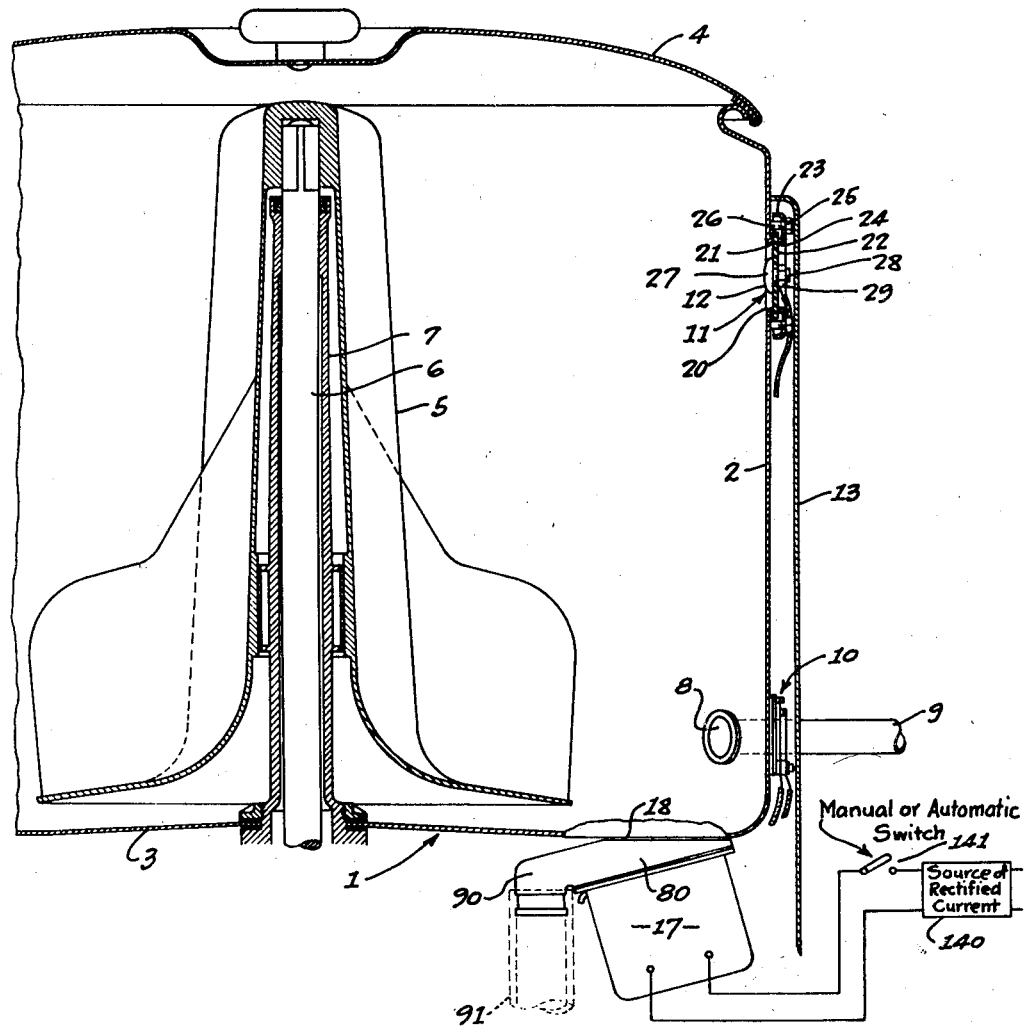
Figure 1 is a vertical section showing a conventional washer embodying the control system of the invention.

Referring to the drawings, the system is illustrated by way of example, in connection with a generally conventional type of clothes washer indicated by the numeral 1 in Fig. 1. This washer 1 is shown as comprising a metallic tub 2 with a bottom 3 and a detachable cover 4. An agitator 5 is carried on the upper end of a shaft 6, extending vertically through a supporting post 7, mounted axially in the tub 2. The shaft 6 is driven by mechanism (not shown), which imparts a suitable motion to the agitator 5 for appropriately moving the clothes in the tub 2.

The tub 2 is provided with a tangentially arranged inlet 8 to which is connected a supply conduit 9, controlled by electrically operated valves for filling the tub. A thermostat 10 mounted on the outside of the tub 2 serves to control the temperature of the water. An electrode structure 11 including a conducting or contact button 12 insulated from the wall of the tub 2, is provided for limiting the height which the water level within the tub may attain.

An outer shell 13 on the tub 2 serves to enclose and protect the contact button structure 11, and the thermostat 10, as well as the leads thereto.

Figure 6:
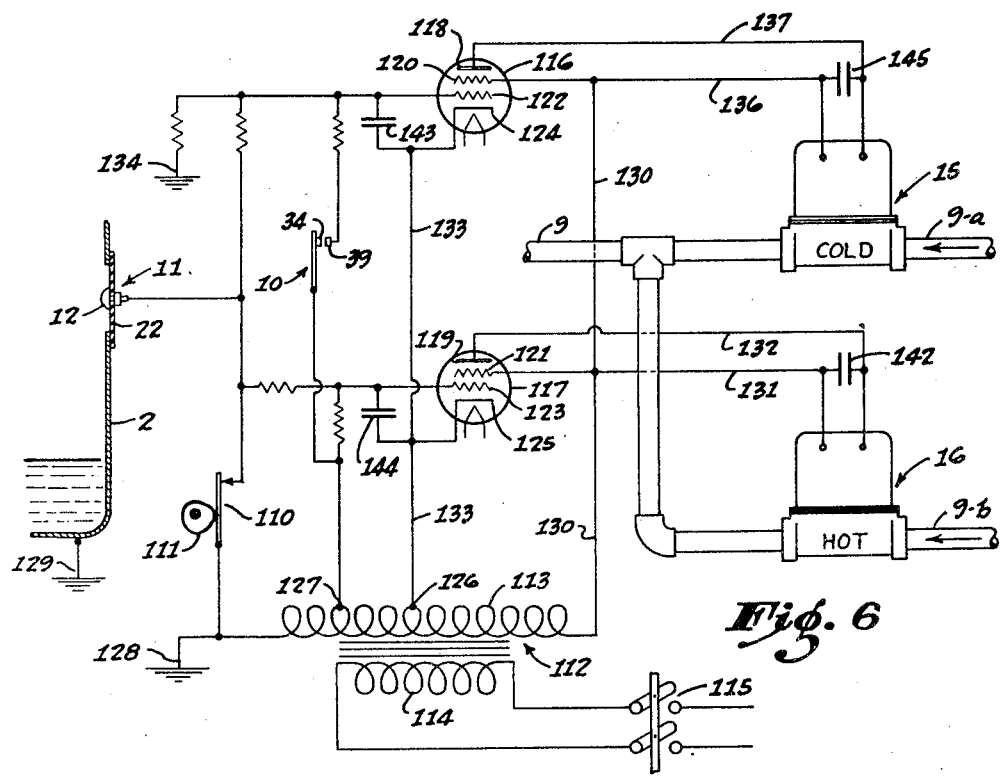
Fig. 6 is a wiring diagram of the control system.

As shown in Fig. 6, the conduit 9 has a branch 9—a connected with a suitable source of cold water (not shown), and controlled by a valve 15, and a branch 9—b connected with a suitable source of hot water (not shown), and controlled by a similar valve 16. A third valve 17 serves to control the outlet or drain from the tub 2. The valves 15, 16 and 17 are electromagnetically operated and will be described hereinafter.

The electrode structure 11 will now be described. Referring to Fig. 1, an opening 20 is formed in the wall of the tub 2 near the top thereof, the wall being flanged outwardly to provide a flat annular surface 21 extending about the opening 20. A disc of insulating material 22 is clamped in a water tight manner against the surface 21 by means of a clamp ring 23, which presents an annular surface 24 opposing the surface 21 and urging the disc 22 there against in response to tightening the nuts 25 on the studs 26 secured in the tub wall.

The contact button 12 comprises a convex head 27 secured on the disc 22 inside of the tub 2, by means of a threaded shank 28 extending through the disc and engaged by a nut 29 on the outside of the disc. It will be obvious that when the water in the tub 2 reaches head 27, the contact button 12 will be in current conducting relation with the tub 2. By suitably connecting the contact button 12 and the tub 2 into the control circuit for valves 15 and 16 (to be presently described), these valves may be caused to close when the circuit between the tub 2 and the contact button 12 is established.

Figure 5:
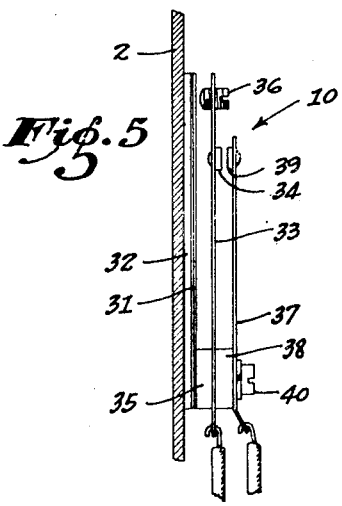
Fig. 5 is a detail of the thermostat.

As shown in Fig. 1, the thermostat 10 is mounted on the outside of the wall of the tub 2, angularly spaced from the inlet 8, and at about the same height. As shown in Fig. 5, the thermostat comprises a bimetallic element 31, closely spaced from the wall of the tub 2 by a thin layer of electrical insulating material 32. In this way the bimetal strip 31 is in good heat conducting relation with the water in the tub 2 and responds quickly to changes in the temperature thereof. This is an important feature since it is the temperature of the water in tub 2 which it is desired to control, rather than the temperature of the water being supplied.

A spring arm 33 carrying a contact 34 is spaced from the bimetal strip 31 by an insulating block 35. The free end of the arm 33 has a screw 36 threaded therethrough one end of which is adapted to be engaged by the strip 31. A second spring arm 37 is spaced from arm 33 by an insulating block 38 and carries at its opposite end, a contact 39 adapted to be engaged by contact 34. A screw 40 serves to maintain the parts in assembled relationship on the wall of the tub 2.

Upon a sufficient rise in temperature of the tub 2 due to entry of hot water therein, strip 31 will flex outwardly (to the right in Fig. 5), engaging the screw 36. Further, flexing will then flex arm 33 and cause contact 34 to engage contact 39. The arms 33 and 37 are so connected into the previously mentioned control circuit that engagement of the contacts 34 and 39 will operate the valves 15 and 16 in a manner to lower the temperature of the water supplied to the tub 2. As the temperature of the tub falls, the bimetal arm 31 will become straighter allowing arm 33 to move to separate the contacts 34 and 39. This causes the valves 15 and 16 to resume their original condition delivering high temperature water to the tub 2.

The screw 36 makes it possible to alter the temperature of the tub water, since by adjusting the screw toward the bimetal strip 31, less flexing of the strip 31 and consequently a lower temperature suffices to cause the contacts 34 and 39 to close and reduce the temperature of the water being supplied. Conversely, if the screw 36 is adjusted away from the strip 31, a higher temperature will be reached before the contacts are closed and the temperature of the water being supplied is reduced.

By arranging the thermostat to respond to the temperature of the tub rather than to the temperature of the water being delivered, proper washing temperature of the water in the tub is assured even though the tub be partially filled with cold water, either by intention or by accident, before the automatic control system is started.

The valve structures which control the inlet and outlet of the tub 2 will now be described. In applications previously filed in the name of William A. Ray, on September 4, 1944, under Serial No. 552,647, entitled "Electromagnetically Operated Valve" and on May 22, 1946, under Serial No. 671,583 entitled "Electromagnetic Valve," valves are shown and described wherein the polar area of the operating magnet is made large and the magnetic path is designed carefully to provide low reluctance. As pointed out in these applications, the ampere turns required by an electromagnet to produce a definite intensity of magnetization depend mainly on the magnetic density and the reluctance of the magnetic path, while the pull exerted is a function of the polar area as well as of the magnetic density. Thus, by increasing the polar area, the pull of the magnet may be increased, and by ensuring that the reluctance be low, the pull may be further increased without increasing the ampere turns. The reluctance may be reduced by arranging the core structure with as few joints as possible, and by ensuring that in these joints the surfaces are sufficiently large and in intimate contact. Additionally, the smallest possible air gap should be provided and the magnet core or cores should be of small diameter, so that the mean length of a turn of the magnet winding and hence the total wire required is reduced. These features are incorporated in the present valve structures.

Figure 3:
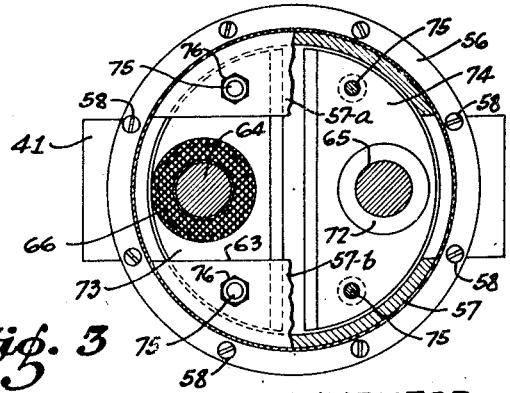
Fig. 3 is a cross section on a reduced scale, taken as indicated by line 3—3 of Fig. 2.

Referring to Figs. 2 and 3, one of the inlet valves for example that valve designated as 15, which controls the cold water is shown, and it is to be understood that the hot water valve 16 is substantially identical, so that the description applies equally well thereto.

The valve 15 includes a valve body 41 having oppositely disposed inlet and outlet openings 42 and 43 separated by a wall or partition 44 having a port 45 threadedly accommodating an annular valve seat 46. A valve closure member 47 serves to close port 45 by resting on the valve seat 46. This closure 47 is shown as comprising a circular disc 48, adapted to engage the seat 46, secured to a circular armature 49 by the aid of a screw and nut, 50 and 51. A flexible water proof diaphragm 52 is clamped between the disc 48 and the armature 49 and serves to guide the closure 47 for movement toward and away from the seat 46. The armature 49 is arranged to be attracted by an electro-magnet 53, which when energized lifts the closure 47 from its seat 46 and opens the valve.

The upper portion of the body 41 has a circular opening 54 slightly larger in diameter than the armature 49, and which is covered by the diaphragm 52. The edge portion of the diaphragm 52 overlies an annular surface 55 formed on the body 41 about the opening 54 and is clamped thereon in sealing relation by the flange 56 of a member 57 secured to body 41 by a plurality of screws 58 passing through the flange 56 and threadedly engaging the body 41.

A shallow inverted cup shaped sealing element 60 has an outer flange 61 interposed between the flanges 56 and the diaphragm 52, and sealing against the diaphragm. This element 60 forms an annular chamber 62 extending a short distance above the diaphragm 52 accommodating the armature 49 which upon energization of the electro-magnet 53 moves upwardly into contact with the lower surface of the inside of the cup.

The member 57 is of non-magnetic material and has portions 57—a and 57—b separated by a wide diametral slot 63. These portions 57—a and 57—b overlie the cup element 60, and serve to mount the electro-magnet structure 53 on the body 41. The magnet structure 53 includes a pair of vertical cores 64 and 65 spaced symmetrically with respect to the axis of the seat 46 and having energizing coils 66 and 67 mounted thereon. These cores 64 and 65 extend through the slot 63 and have wide tapered surfaces, such as 65—a, at their upper ends for intimate magnetic contact with a bar 68 secured to the cores as by the aid of self-locking nuts 69 threadedly engaging the ends of the cores.

The lower ends of the cores 63 and 64 are each provided with an enlarged head 71 and 72 to which are attached respectively, as by welding the substantially semi-circular pole pieces 73 and 74. These pole pieces are disposed immediately below the portions 57—a and 57—b of the supporting member 57 being secured thereto by screws 75 (Fig. 3) with their heads countersunk in the lower faces of the pole pieces, the screws being engaged by nuts 76 contacting the upper sides of the portions 57—a and 57—b. The parts are so proportioned that when assembled the lower surfaces of the pole pieces 73 and 74 are disposed immediately above the cup 60.

The pole pieces 73 and 74 together define an interrupted circular area slightly larger than the area of the armature 49, and much greater than the cross sectional areas of the cores 64 and 65. In addition to the large polar areas and the effective joining of the cores 64 and 65 by the bar 68 as factors in reducing the power consumption of the electro-magnet 53, the air gap is made small by ensuring that the armature 49 has a small lift, for example, one-sixteenth or three thirty-seconds of an inch.

In addition to guiding the closure member 47 the diaphragm 52 serves to close and isolate the chamber 62 formed by the cup 60. To permit the closure 47 to move in response to energization and deenergization of the electromagnet 53, a small port 77 is provided extending through the diaphragm 52 and the armature 49. By suitably restricting the effective size of port 77, the movement of the closure member 47 may be damped to avoid abrupt closing of the valve and resultant water hammer.

The drain valve structure 17 shown in Fig. 4 is quite similar to the valve structure just described, but operates in an inverted position, spring means being provided for urging the closure member to closed position. Furthermore, the closure member is inclined. In this way the valve is self-cleaning, the discharging water flowing over the closure to the outlet serving to flush grease, lint and the like from the closure member and the seat, which insures tight closing of the valve.

Referring to Fig. 4, the structure 17 comprises a valve body 80 with an inlet port 81 defined by a tubular portion 82 integrally formed within the body 80 and extending in a vertical direction. The body 80 is secured to an outlet or discharge nozzle 18 formed on the tub bottom 3, as by welding, so that the tubular portion 82 surrounds the outlet 18, which may be provided with a suitable screen 18—a. The tube 82 terminates in a downwardly facing valve seat 83 inclined downwardly toward the outlet of the body 80. A valve closure member 84 serves normally to maintain the port 81 closed for this purpose being urged to engage the valve seat 83 by a spring member 85. This spring 85 has sufficient strength to maintain the closure 84 tightly seated against the force exerted by the head of water in the tub 2. The closure 84 comprises a circular armature 86 suitably secured to the lower side of a flexible water proof diaphragm 87 which guides the closure for movement toward and away from seat 83. The upper surface of this diaphragm cooperates with seat 83 to form a closure therefor. The armature 86 is arranged to be attracted by an electromagnet structure 88, which when energized moves the closure 84 downwardly away from its seat 83 against the force of the spring 85, thus opening the valve.

The valve body 80 provides a space 89 surrounding the tub 82 and having an outlet nozzle 90 adapted to have a suitable conduit 91 (Fig. 1), secured thereon for leading the discharge from the tub 2 to a desired point. The body 80 has a downwardly directed circular opening 92 slightly larger than the armature 86, and which is covered by the diaphragm 87. The edge portion of the diaphragm 87 is clamped in sealing relation on the annular inclined surface 93 provided by the body 80 by a flange 94 of member 95, which is secured to the body 80 by a plurality of screws 96 passing through the flange 94 and threadedly engaging the body 80.

As in the inlet valve previously described, a cup shaped element 97 is provided having an outer flange 98 interposed between the surface 93 and the diaphragm 87. The cup 97 thus provides an annular chamber 99 accommodating the armature 86.

The electromagnet structure 88 is substantially identical with the previously described magnet 53 having substantial semi-circular pole pieces 100 and 101 which together define a circular area slightly larger than the area of the armature 86 and serve to mount the magnet 88 on the body 80 by means of the member 95.

The diaphragm 87 serves to seal the chamber 99 against entry of fluid from the valve body 80. To permit the closure 84 to move freely in response to energization and deenergization of the electro-magnet 88, the chamber 99 has a vent 102 constantly open to the atmosphere. As a safeguard against leakage of the diaphragm 87, the vent 102 is located at the lower edge of the cup 97, so that any liquid finding its way into the cup immediately drains away.

The spring member 85 is interposed between the inner surface of the cup 97 and the underside of the armature 86, and comprises a circular member 103 of resilient material having a diameter substantially equal to the inside diameter of the cup 97. A plurality of radially and upwardly extending fingers 104 are punched from the member 103, being attached thereto at their inner ends, and leaving openings 105 for accommodating the fingers 104 when the fingers are flexed.

When the magnet 88 is energized the armature 86 is urged downwardly against the force exerted by the fingers 104 into contact with the member 103, the fingers 104 being flattened into the openings 105. In this way the air gap when the armature 86 is in attracted position is very small.

The type of valves just discussed require only a small current for operation and hence are particularly well adapted for use in grid controlled circuits utilizing electronic emission devices. Accordingly, they may be advantageously used in connection with automatic or semi-automatic apparatus of various types, such as automatic or semi-automatic washers. Fig. 6 shows a control circuit incorporating the washer of Fig. 1.

A switch 110 serves to control the inlet valves 15 and 16, and may if desired, be operated by a cam 111 driven by a typical time cycle control. Operating current for the valves 15 and 16 is furnished by a suitable transformer 112, having a secondary 113, and a primary 114 adapted to be connected with a suitable source of current by a switch 115.

The transformer secondary 113 furnishes high potential current to the electromagnets of valves 15 and 16 in accordance with the current conducting condition of the electronic emission tubes 116 and 117. These tubes may be of any suitable type and are shown as identical, having respectively anodes 118 and 119, screen grids 120 and 121, control grids 122 and 123, and indirectly heated cathodes 124 and 125.

The cathodes 124 and 125 are connected to a tap 126 at an intermediate point on the transformer secondary 113. The control grid 123 is connected to a tap 127 which is negative with respect to tap 126, the control grid 122 being arranged to be connected also to this tap 127 upon closing of the thermostat contacts 34 and 39. The low potential end of the secondary 113 is connected to ground as shown at 128. The control grids 122 and 123 are arranged so that both are connected to ground upon closing of the switch 110. Furthermore, the contact button 12 is arranged to ground the grids 122 and 123 independently of the switch 110 upon the water level in tub 2 reaching this button. For this purpose the tub 2 is grounded as at 129.

The operation of the circuit is as follows. Switch 110 is normally maintained closed by the timer cam 111. Upon closing the main switch 115 to inaugurate operation of the washer, no current can flow across either tube 116 or 117 since they are each biased to cut off by the ground connection through switch 110, hence valves 15 and 16 remain closed. Upon opening of the switch 110 in response to movement of the timer cam 111, the negative potential on control grid 123 of tube 117 is reduced to that provided by the tap 127, so that tube 117 becomes conducting and current flows through the electromagnet of the hot water valve 16, causing the valve to open and deliver hot water to the tub 2. This current path is as follows: From the transformer secondary 113 via leads 130, 131 to the electromagnet of valve 16, hence via lead 132 to anode 119 to cathode 125 and lead 133 to the secondary tap 126.

At this time the thermostat contacts 34, 39 are open and the potential on the control grid 122 of tube 116 remains at cut-off by virtue of the ground connection 134. Thus, tube 116 remains non-conducting and the cold water valve 15 stays closed. When the wall of the tub 2 in response to entry of hot water into the tub attains the temperature at which the thermostat 10 is set (say 140° F.), contacts 34 and 39 close reducing the bias on the grid 122 to substantially that provided by the transformer tap 127. This causes tube 116 to become conducting so that current flows from lead 130 via lead 136 through the electromagnet of valve 15, lead 137 anode 18 to cathode 124 and return via lead 133. This causes the valve 15 to open and deliver cold water to the tub 2. Upon a reduction of the tub temperature sufficient to cause the contacts 34 and 39 to open, the tube 116 is again biased to cut off causing valve 15 to close. The operation of valve 15 occurs as often as necessary to maintain the temperature of the tub water within predetermined limits as long as the timer switch 110 is open.

If desired, by pass condensers such as 145, 142 may be connected across the windings of the valves 15 and 16; and similar condensers 143, 144 may be connected across the input circuits of tubes 116, 117.

In response to closing of the switch 110 in response to movement of the cam 111, the tubes 116 and 117 are again biased to cut-off so that no current flows and valves 15 and 16 close. This completes a cycle of operation.

The contact button 12 is arranged to form a connection between the control grids 122 and 123 and ground, which by-passes the switch 110. For this purpose, the button 12 is connected to the control grids 122 and 123 ahead of the switch 110 and the tub 2 is grounded at 129 as previously mentioned. Accordingly, when the water level in the tub 2 reaches the button 12, the control grids 122 and 123 are grounded and tubes 116 and 117 are biased to cut-off independently of the switch 110. This ensures against over-filling the tub 2.

An important feature of the contact button 11 is, that there is no tendency for grease, lint, or the like, to accumulate thereon and prevent proper operation. Furthermore, it may readily be cleaned whenever the tub is cleaned with slight additional effort.

The drain valve 17 may be arranged for operation by an appropriate source of rectified current 140 (Fig. 1), such as a tube or a dry disc rectifier, a switch 141 being provided to connect the magnet 88 of the valve 17 with the source 140. The switch 140 may be arranged for manual or appropriate automatic operation.

The inventor claims:

1. In a system for supplying water to a container: a hot water valve; a cold water valve; both said valves being biased to closed position; a pair of electromagnetic means for respectively operating said valves to open position; a pair of electronic emission devices, each having an input circuit, as well as an output circuit, said output circuits being respectively connected to the electromagnetic means to energize said means; each of said electronic emission devices having a control electrode connected in the corresponding input circuit; a thermostatic switch subjected to the temperature of the water discharged into the container to bias the control electrode associated with the cold water valve to energizing value when the temperature is increased to a limiting high value, and to bias the control electrode associated with the cold water value to deenergizing value when the temperature attains a lower value below said limiting value; and means responsive to the attainment of a definite level of the water in the container for biasing both control electrodes to a deenergizing value.

2. In a system for supplying water to a container: a hot water valve; a cold water valve; both said valves being biased to closed position; a pair of electromagnetic means for respectively operating said valves to open position; a pair of electronic emission devices, each having an input circuit, as well as an output circuit, said output circuits being respectively connected to the electromagnetic means to energize said means; each of said electronic emission devices having a control electrode connected in the corresponding input circuit; a common control means for biasing both control electrodes to a value such as to deenergize both said electromagnetic means for one position of the control means, and having another position for biasing only the control electrode of that electronic emission device that controls the hot water valve to cause energization of the respective electromagnetic means; a thermostatic switch subjected to the temperature of the water discharged into the container independently to bias the control electrode associated with the cold water valve to energizing value when the temperature is increased to a limiting high value, and to bias the control electrode associated with the cold water valve to deenergizing value when the temperature attains a lower value below said limiting value; and means responsive to the attainment of a definite level of the water in the container for biasing both control electrodes to a deenergizing value.

WILLIAM A. RAY.

REFERENCES CITED

The following references are of record in the file of this patent:

UNITED STATES PATENTS

| Number | Name | Date |
|---|---|---|
| 775,021 | Waterman | Nov. 15, 1904 |
| 1,103,756 | Gebhardt | July 14, 1914 |
| 1,346,898 | Kingsbury | July 20, 1920 |
| 1,520,691 | Boyuls | Dec. 30, 1924 |
| 1,585,451 | White | May 18, 1926 |
| 1,883,957 | Koch | Oct. 25, 1932 |
| 1,949,287 | Tschammer | Feb. 27, 1934 |
| 2,017,368 | Magner | Oct. 15, 1935 |
| 2,043,194 | Eggleston | June 2, 1936 |
| 2,053,704 | Drake et al | Sept. 8, 1936 |
| 2,059,635 | Fillo | Nov. 3, 1936 |
| 2,161,604 | Watts | June 6, 1939 |
| 2,173,564 | Osuch | Sept. 19, 1939 |
| 2,258,360 | Hetzer | Oct. 7, 1941 |
| 2,278,911 | Breckenridge | Apr. 7, 1942 |